United States Patent [19]

Brueggemann

[11] Patent Number: 4,682,842
[45] Date of Patent: Jul. 28, 1987

[54] SCANNING SYSTEM WITH TWO REFLECTIONS FROM SCANNING SURFACE BY MIRRORS WITH OPTICAL POWER

[75] Inventor: Harry P. Brueggemann, San Marino, Calif.

[73] Assignee: Xerox Corporation, Stamford, Conn.

[21] Appl. No.: 646,324

[22] Filed: Aug. 31, 1984

[51] Int. Cl.⁴ .............................................. G02B 26/10
[52] U.S. Cl. ...................................... 350/6.7; 350/6.6
[58] Field of Search .................... 350/6.4, 6.5, 6.6, 6.7

[56] References Cited

U.S. PATENT DOCUMENTS

| | | |
|---|---|---|
| 3,520,586 | 7/1970 | Bonsky . |
| 3,897,132 | 7/1975 | Meeussen . |
| 3,909,105 | 9/1975 | Neiswander . |
| 4,002,830 | 1/1977 | Brown . |
| 4,202,597 | 5/1980 | Moore . |
| 4,247,160 | 1/1981 | Brueggemann . |
| 4,268,110 | 5/1981 | Ford . |
| 4,312,590 | 1/1982 | Harbaugh . |

FOREIGN PATENT DOCUMENTS 2053505  2/1981  United Kingdom ................ 350/6.6

OTHER PUBLICATIONS

Minami et al, Proc. SPIE Optical System Engineering, vol. 193, pp. 202-208 (179).

Primary Examiner—John K. Corbin
Assistant Examiner—Loha Ben
Attorney, Agent, or Firm—Franklyn C. Weiss

[57] ABSTRACT

A rotating, draft angle polygon scanner system for correcting wobble by double reflection of an infinite conjugated light beam from a pair of fixed mirrors having optical power provided by aspheric surfaces. In addition to their wobble correction function, the optical powered mirrors provide the scan and focus functions of conventional f-θ scan lens optics and hence such f-θ scan lens optics can be eliminated from the scanner system, thereby providing an all mirror scanner system.

2 Claims, 6 Drawing Figures

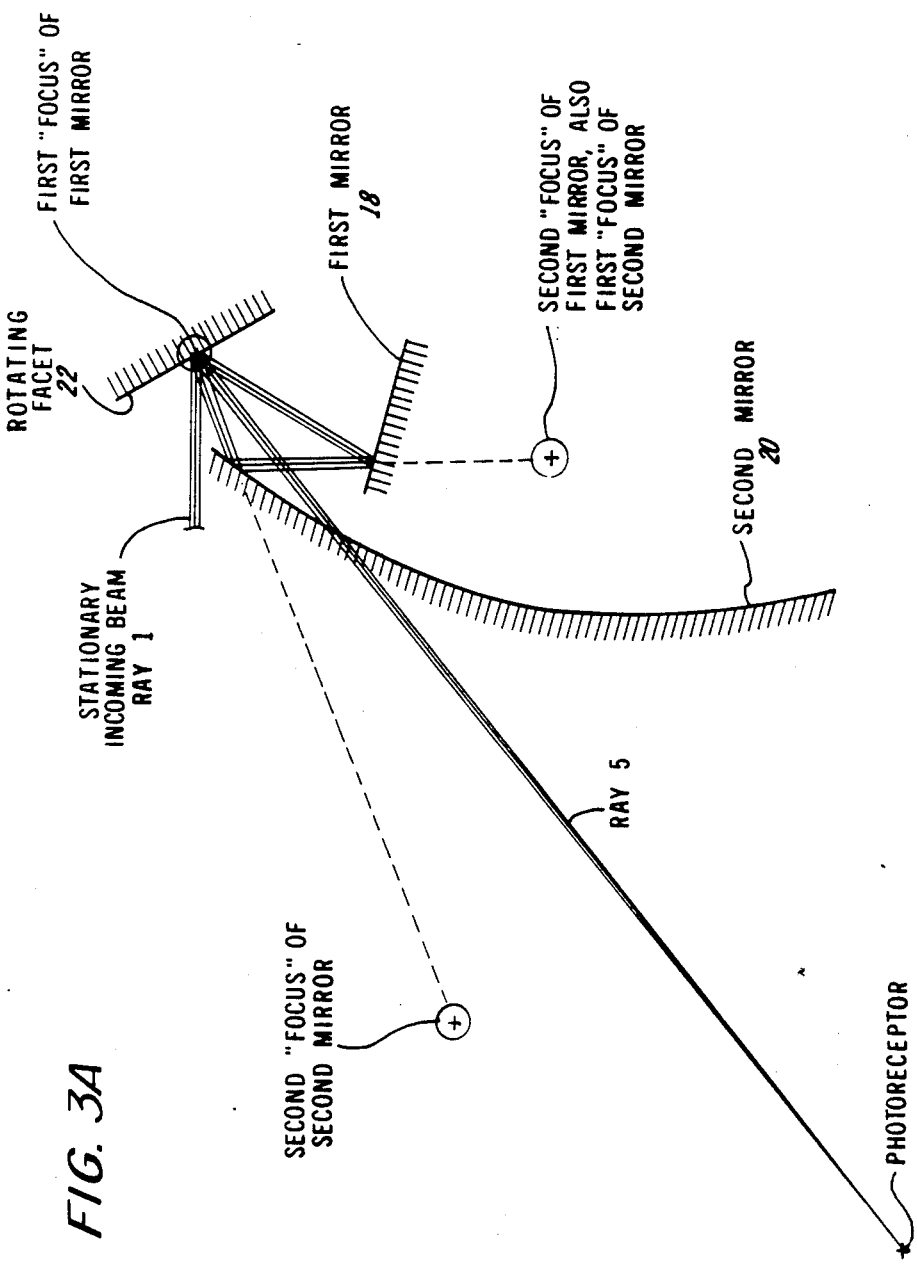

SCANNING SYSTEM WITH TWO REFLECTIONS FROM SCANNING SURFACE BY MIRRORS WITH OPTICAL POWER

BACKGROUND OF THE INVENTION

Many modern day raster scanning optical image systems utilize a rotating polygon scanner, which by the rotational movement thereof causes the reflected light of an incident, collimated light beam to revolve about an axis near the center of rotation of the rotating polygon. Such scanning systems often suffer from the effects of wobble, introduced into the system by inaccuracies in the bearings utilized to impart motion to the polygon and inaccuracies in the grinding and positioning of the actual facets on the faces of the polygon. The wobble effects cause an uneven raster scan which produces irregular locations of the output scan lines whether utilized in an input or output fashion.

It has been proposed that wobble be cancelled by double reflection from the facets of a rotating polygon, such facets being in parallelism with the axis of rotation. See Mussen et al, U.S. Pat. No. 3,897,132. After a light beam normally incident on a facet is reflected by the facet, the light beam is returned to the same facet, by an arrangement of mirrors, for a second reflection. If there are an even number of mirror reflections between facet reflections, wobble introduced at the first facet reflection is cancelled by the second facet reflection. However, in such a system with polygon facets parallel with the polygon axis of rotation, that is, a zero draft angle polygon, bow effects, defined as a deviation of the scan line from a straight line, are inevitable. If the embodiment of the cited U.S. Patent is analyzed, it can be shown that wobble is well corrected over the scan but bow is excessive, causing a displacement of at least three quarters of an inch at the ends of a nine inch scan line.

U.S. patent application, Ser. No. 532,323, now abandoned filed Sept. 15,1983, in the name of the same inventor and assignee of the present application, discloses a polygon scanning system for correcting wobble by double reflection from the active facet, with the wobble correction being achieved without bow effects. Instead of the impinging light beam being transverse to the axis of rotation of a rotating polygon having facets in parallelism to the axis of rotation of the polygon, there is disclosed a rotating polygon with facets having a predetermined draft angle with the axis of rotation of the polygon, and a light beam impinging on the facets. Once again, by two further reflections from flat, fixed mirrors, the light beam is made to reimpinge upon the same facet; correcting wobble, but now with no effects of bow. Three design variables are used to reduce the effects of bow in the system of the previously filed application; namely, the angle of ray incidence at the first facet reflection, the angle of ray incidence at the second facet reflection, and the draft angle of the polygon.

After the second facet reflection the light beam is passed through conventional f-$\theta$ scan lens optics having appropriate power in the tangential plane, such that the scanning light beam is linearized and focussed at the surface to be scanned. It would be advantageous to eliminate the f-$\theta$ scan lens optics, the advantage being not only a reduction in the component count, but also, if the function of the f-$\theta$ scan lens optics could be achieved by mirrors, the entire optical train would consist only of mirrors and thus have the same focus and scan characteristics at any wavelength. Such an all mirror optical train scanner could operate with white light. A white light raster input scanner (RIS) for scanning documents in color must have an apochromatic lens optical system. An apochromatic lens (corrected for three colors) is expensive, whereas an all mirror RIS would be very inexpensive.

SUMMARY OF THE INVENTION

A rotating, draft angle polygon scanner system for correcting wobble by double reflection of an infinite conjugated light beam from a pair of fixed mirrors having optical power provided by aspheric surfaces. In addition to their wobble correction function, the optical powered mirros provide the scan and focus functions of conventional f-$\theta$ scan lens optics and hence such f-$\theta$ scan lens optics can be eliminated from the scanner system, thereby providing an all mirror scanner system.

BRIEF DESCRIPTION OF THE DRAWINGS

FIGS. 3 and 3A are a cross-scan plane view of a disclosed scanning system having wobble, bow and field curvature correction.

DETAILED DESCRIPTION OF THE INVENTION

It is proposed that the f-$\theta$ scan lens optics be eliminated from the dual reflection system of the aforenoted patent application, with the function of the f-$\theta$ scan lens optics being provided by putting optical power on the flat mirrors that provide for the second reflection from the same facet of the draft angle polygon. The wobble correction would still be maintained and bow would be corrected by the three design variables previously mentioned. But because of the power that is added to the two flat fixed mirrors, the relationship between the three design variables is not exactly as taught in the aforenoted patent application. Anyone experienced in designing a scanner according to the aforenoted patent application could easily make the small adjustments to the variables to obtain a bow-free scan line. However, development of this concept, by arbitrarily putting spherical curvature on the flat mirrors, quickly reveals a problem: severe astigmatism. This is due to the fact that the fixed mirrors are at an angle to the beam being reflected. The power of a curved mirror is different in orthogonal directions when the beam is at an angle to the mirror, instead of being at near-normal angles of incidence. By balancing the tilt of the two mirrors against their curvatures, it is possible to eliminate astigmatism at the center of scan position, but astigmatism is still severe at other scan positions. Allowing the mirrors to become toroids instead of spheres, and optimizing with this extra design freedom, yields an insignificant improvement in the off-center asigmatism.

Astigmatism can be virtually eliminated by utilizing, instead of the flat mirrors of the prior application, mirrors with optical power, that is, mirrors with curved active surfaces that are rotationally symmetric but not spherical, that is, aspheric surfaces which have the form:

$$Z = \frac{ch^2}{1 + [1 - (1 + k)c^2h^2]^{\frac{1}{2}}} + Ah^4 + Bh^6 + Ch^8 + Dh^{10} \quad (1)$$

where, in rectangular coordinates
Z=the sag of the surface
$h^2 = x^2 + y^2$
c = the curvature at the pole of the surface, that is, the reciprocal of the radius of the curve at the apex
k = the conic coefficient ($K = -e^2$, where 'e' is the eccentricity of the conic shape):
  k=0 for a sphere
  k>0 for oblate spheroid
  0>k>−1 for ellipsoid with major axis on the optical axis
  k=−1 for paraboloid
  k<−1 for hyperboloid
A, B, C, D = $4^{th}, 6^{th}, 8^{th}$ and $10^{10th}$ order deformation terms, respectively, which can be zero for this application but could be other than zero if additional curvature is required for system refinement or tweaking.

Figure 1:
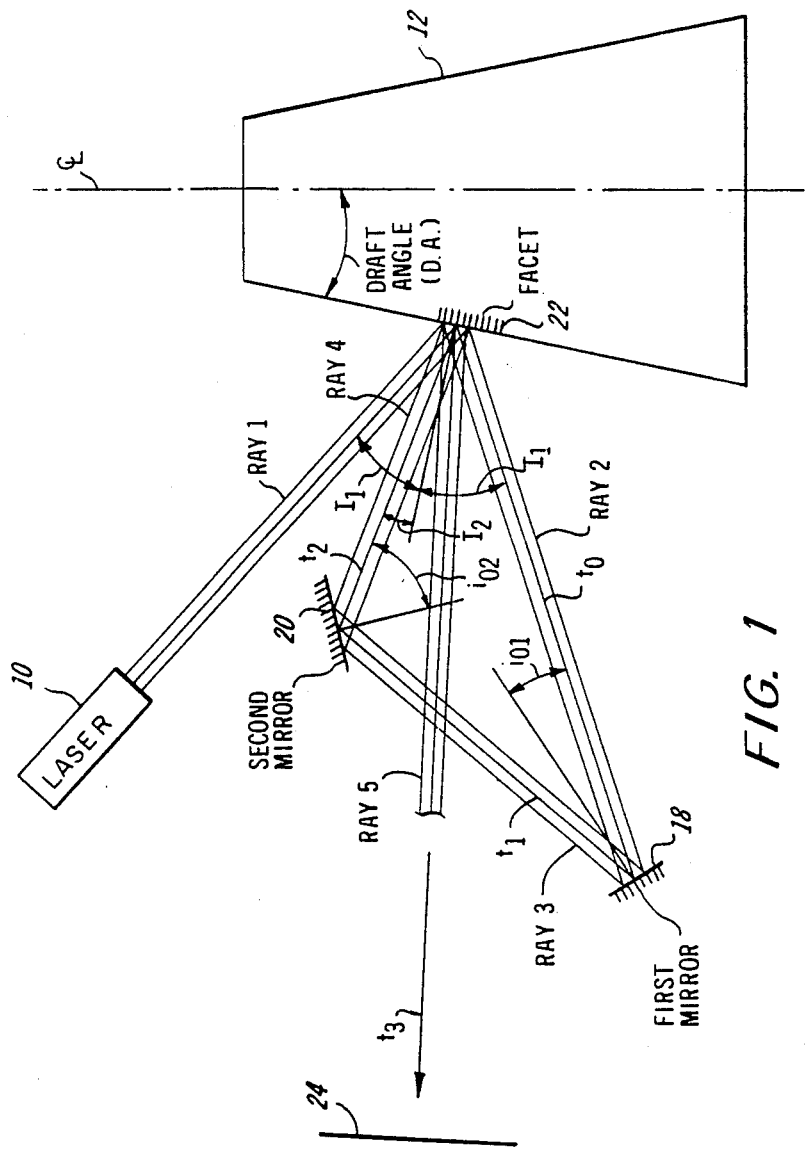
FIG. 1 is a cross-scan plane view of a disclosed scanning system having wobble and bow correction.
Figure 2:
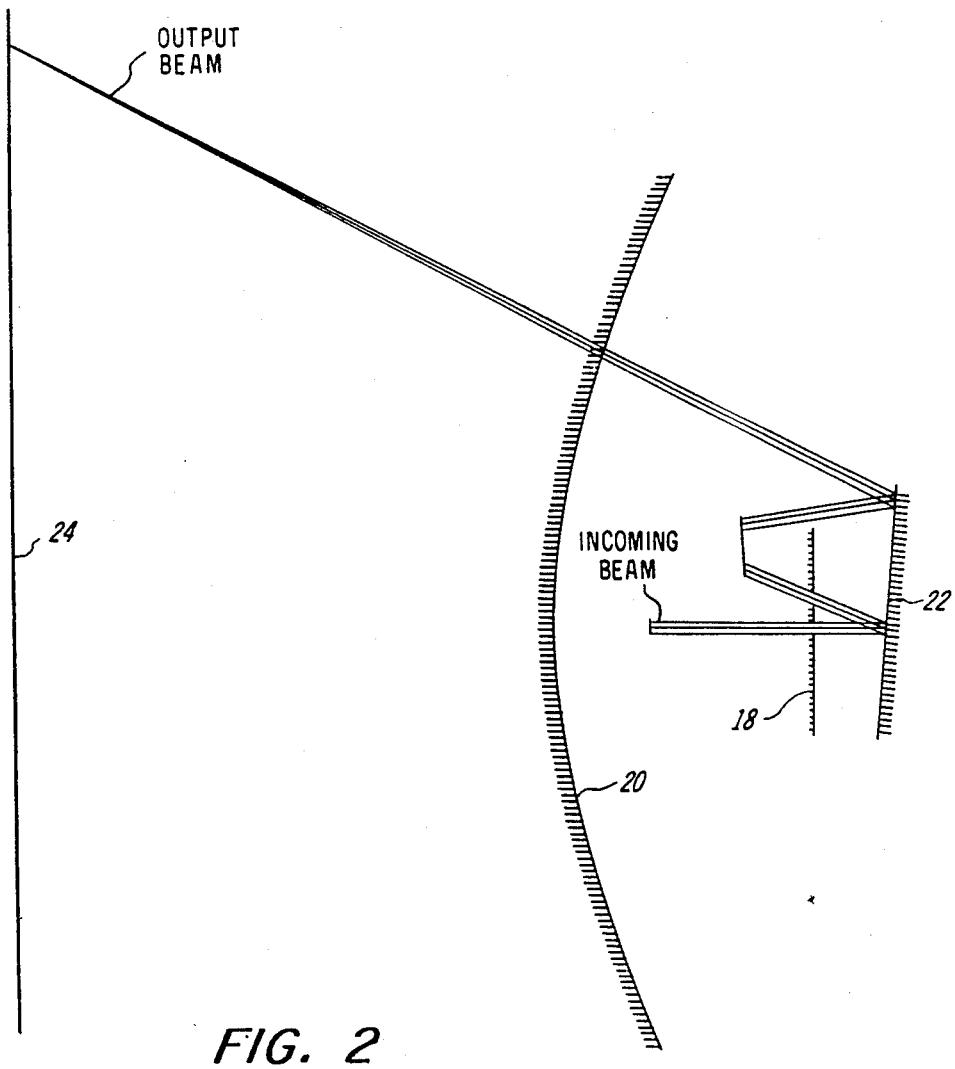
FIG. 2 is a scan plane view of the system of FIG. 1.

An example of the scanning system disclosed is seen in FIG. 1, which is a sectional view through the center of scan, and FIG. 2 which is a cross-scan view. Rotating polygon 12 is rotated, at a constant angular velocity, about a line denoted as center line (C/L) by a conventional drive motor arrangement (not shown). This polygon could have any number of facets, while for this application, the rotating polygon has 20 distinct facets. Rather than having the plane of each facet parallel to the axis of rotation, or the center line, as in conventional scanning systems using zero draft angle polygons, the polygon facets are tilted toward the center line at an angle denoted as the "draft angle" (D.A.). Impinging upon one facet 22 of the rotating polygon 12 is infinite conjugate light (collimated light) from a light source such as, for example, a laser 10. Although polygon 12 is shown as having externally reflecting facets, a polygon having internally reflecting facets could be used. No optics are shown between laser 10 and facet 22 for ease of illustration, but certain optics could be necessary depending upon the type of laser chosen. Ray 1 coming from the laser 10 is co-planar with the center line, and is directed to facet 22 of rotating polygon 12. The light strikes the polygon and is reflected off with the angle of reflection equalling the angle of incidence. The angle I1 is defined in FIG. 1 as the angle between laser ray 1 and the normal to the surface of facet 22.

For this definition of I1, the normal to the facet 22 is taken to be in the plane of FIG. 1, and is co-planar with the centerline and with ray 1. This position of the normal is defined as the center of scan. After the light is reflected by facet 22, it travels to first aspheric mirror surface 18. Thus, ray 2 is ray 1 reflected by facet 22. Whereas ray 1 is stationary in space regardless of the position of the polygon 12, ray 2 rotates as the polygon rotates. Mirror surface 18 must be large enough in the direction perpendicular to the plane of FIG. 1 so that ray 2 strikes it at all times during the active scan of facet 22. Ray 2 is reflected from mirror surface 18, and is shown as ray 3. From the surface 18 the ray 3 travels to second aspheric mirror surface 20, from which it is reflected as ray 4, as seen in FIG. 1. Since ray 3 is rotating at the same angular rate as ray 2, the aspheric mirror surface 20 must be even larger than surface 18 to reflect ray 3 during active scan, because surface 20 is optically further from the facet 22 than surface 18. Ray 4 now travels back to facet 22, still with the same angular rate it had after being reflected from facet 22 as ray 2. Since the facet 22 is rotating, and ray 4 is also moving in the same direction as the facet, facet 22 need not be as large as mirror surface 20. The spacing between mirrors 18 and 20, and facet 22, must be kept small so that the mirrors and facet do not become too large. One skilled in the art of designing underfilled facet scanners will know how to choose the correct values of the laser beam parameters, so that the mirrors and the poygon do not become too large.

Ray 4 has many angles of incidence with facet 22 during the scan, because it rotates as the polygon rotates. Only one of these angles is defined as $I_2$ in FIG. 1, this is the angle between ray 4 and the normal to facet 22 in the plane of the paper as shown in FIG. 1. After reflection again by facet 22, ray 4 becomes ray 5, which is the photosensitive surface scanning ray that is corrected for facet-to-facet wobble, and at the same time has no bow, and is virtually free of astigmatism.

The condition of freedom from astigmatism requires that a "focus" of each aspheric mirror surface be located at a stationary part of the beam. For the first fixed mirror 18, this point can be the point of first reflection from the facet 22, since the beam is stationary in space until after the first reflection. The first aspheric surface mirror 18 will form an image of the first reflection, this image is also stationary in space since the mirror 18 is stationary. This image is the other 'focus' of the first mirror 18, and is the focus of the second aspheric surface mirror 20 (FIG. 3A).

In system usage, the aspheric surface mirror optics must meet the demand of reduced astigmatism and other demands, such as wobble correction, operation at "infinite conjugates", and the geometry of returning the beam after the first facet reflection, back to the facet for the second reflection at the correct angle of incidence. It is also desirable to have the first and second facet reflections occur at the same point on the facet at the center-of-scan, this minimizes the deleterious effect of facet curvature, if the facets are not manufactured to be exactly flat.

Referring further to FIG. 1, algebra has been developed to specify the parameters of the cross-scan curvatures of both the first aspheric surface mirror 18 and the second aspheric surface mirror 20, in terms of the distance between the mirrors 18 and 20 and the active facet 22, the angle of incidence of the beam at each mirror, and the distance from the facet 22 to the photoreceptor or photosensitive surface 24 to be scanned. System performance constraints determine the relationship between the foregoing parameters. To correct for wobble and operate with an "infinite conjugate" input beam, that is, a perfectly collimated input beam, the following equations apply and must be satisfied:

$$C_{X1} = -\frac{t_2 \cos i_{01}}{2t_1 t_3} \quad (2)$$

$$C_{X2} = \frac{(t_1 + t_2)\cos i_{02}}{2t_1(t_2 + t_3)} \quad (3)$$

where, referring again to FIG. 1, $t_o$ is the distance between the active facet of the polygon and the first aspheric surface mirror, $t_1$ is the distance between the first and second aspheric surface mirrors, $t_2$ is the distance between the second aspheric surface mirror and the active facet of the polygon, and $t_3$ is the distance from the facet to the photosensitive surface. These distances are measured along the chief ray of the beam at the center-of-scan, and correspond to the rays 2, 3, 4 and 5. The angles $i_o$ are the angles of incidence at the fixed, aspheric surface mirrors, the subscript 1 and 2 identify mirrors 18 and 20, respectively. The curvatures $C_x$ are the curvatures of the aspheric surface mirrors in the cross-scan plane, again the numerical subscripts in equations (2) and (3) identify the mirror.

From the geometry of a triangle, it is clear that $(I_1 + I_2) + 2i_{o1} + 2i_{o2} = 180°$. To return the beam to the facet at the second reflection so that it is superimposed on the first reflection, the law of sines requires that:

$$\frac{\sin 2i_{01}}{t_2} = \frac{\sin 2i_{02}}{t_0} = \frac{\sin(I_1 + I_2)}{t_1} \quad (4)$$

When all of these equations are satisfied, the parameters of each aspheric surface mirror can be established. These are taken as the radius of curvature at the apex of the mirror, r, and the eccentricity of the mirror, e. As before, numeric subscripts 1 and 2 are used to identify aspheric surface mirror 18 and 20, respectively. The mirror parameters are:

$$r_1 = \frac{\cos^3 i_{01}}{C_{X1}} \quad (5)$$

$$r_2 = \frac{\cos^3 i_{02}}{C_{X2}} \quad (6)$$

$$e_1^2 = \frac{\cos^4 i_{01} - 2(t_0 C_{X1})\cos^3 i_{01} + (t_0 C_{X1})^2}{(t_0 C_{X1})^2} \quad (7)$$

$$e_2^2 = \frac{\cos^4 i_{02} - 2(t_9 C_{X2})\cos^3 i_{02} + (t_9 C_{X2})^2}{(t_9 C_{X2})^2} \quad (8)$$

where $t_9$ is an intermediate parameter given by $$t_9 = t_1 - \frac{r_1}{\cos i_{01} \left[\cos i_{01} - e_1 \sqrt{1 - \frac{\sin^2 i_{01}}{e_1^2}}\right]} \quad (9)$$

Eccentricity is used here instead of the k parameter of equation (1), because e is signed, which is lost in squaring. The "focus" that is closer to the mirror at the point of reflection is positive, the "focus" that is further away is negative.

The design parameters for a specific design of the system of FIGS. 1 and 2 are provided with the given parameters $I_1 = 30°$, $I_2 = 9.16°$, $t_2 = 1$ inch, $t_3 = 10$ inches, $i_{01} = 16.01212°$ and a polygon draft angle of 16.53 degrees. Solving the above equations simultaneously yields for the curvature of the first mirror 18 a value of $C_{X1} = -0.04035745$, and for the second mirror 20 a value of $C_{X2} = 0.04867009$. The angle of incidence $i_{o2}$ at the second mirror 20 is 54.40788, the value of $t_0$ is 1.785027 inches, and of $t_1$ is 1.190862 inches. The parameters of the two optical power mirrors 18 and 20 are $r_1 = -22.005039$ inches and $r_2 = 4.0507155$ inches $e_1 = -13.78910104$ and $e_2 = 2.11748621$.

These design parameters must be converted to a prescription, which can be put onto a computer and analyzed, or to have the computer draw a layout of the design. Commercial optical software is available for analysis or layouts; a person versed in the art of optical design will understand how to enter the prescription into the various kinds of commercial software. A specific prescriptin of the design given above is set forth in Table I. The specific prescription is in Code V, a software package offered by Optical Research Associates.

The design given above has bow, the ends of the scan are 0.18 inch lower than the center of scan. This can be greatly reduced by simply changing the three design parameters of the system such as by changing the alpha angles on surfaces 2, 11 and 27 the alpha angle is the angle of rotation about the x axis of the local coordinate system, for a given surface.

When a draft angle polygon scanner system with optical power mirrors as shown in FIG. 1 is tested, it is found that it provides a scanning spot that is barely diffraction limited at 300 spots per inch, the residual aberrations being scanning field curvature and coma. Since astigmatism has been eliminated, it might be thought that field curvature is due only to the curvature of the Petzval surface. The Petzval curvature contribution of a mirror is the negative of the power of the mirror, since the index of refraction of a mirror is $-1$. The Petzval curvature of a system of mirrors is the sum of the Petzval contributions of each mirror. In a system of two mirros the Petzval sum is zero if the mirrors have equal but opposite powers. But making the Petzval sum equal to zero does not correct field curvature in the scanning system of FIG. 1. That is because the beam is reflected from the rotating polygon facet a second time, after the last mirror with power. The only way to flatten the scanning field curvature is to have a large amount of Petzval curvature in the mirror system. The sense of the required Petzval curvature is that of a positive (concave) mirror.

Equations (2) and (3) show the values of the conic mirror curvatures required in the cross-scan plane, at the center-of-scan position, at the point where the beam is reflected from each mirror. It is seen that $C_{x1}$ must always be negative, because the equation for $C_{x1}$ has a minus sign before it, and all the parameters in the equation are positive. This negative mirror makes it impossible to get enough Petzval curvature to cancel the scanning field curvature.

Equations (2) and (3) were derived to satisfy two requirements—wobble correction and infinite conjugates. Wobble correction must be retained, therefore the requirement for infinite conjugates would be abandoned if scanning field curvature is to be eliminated or significantly reduced. This means that the beam (ray 1) is not collimated at the first reflection from the facet 22. The deviation from collimation is not large, being 10 or 20 minutes of arc, and can be provided by standard collection optics placed between laser 10 and polygon 12.

Abandoning the requirement of infinite conjugates means that $C_{x1}$ and $C_{x2}$ are not both dependent variables in the design. One of them can be an independent variable, then to satisfy the requirement for wobble coorection, the other one becomes a dependent variable. Selecting $C_{x2}$ as the independent variable, then the equation defining $C_{x1}$ becomes:

$$C_{X1} = \frac{\cos i_{01}[(t_0 + t_1 + t_2)\cos i_{02} - 2(t_0 + t_1)(t_2 + t_3)C_{X2}]}{2t_0[(t_1 + t_2 + t_3)\cos i_{02} - 2t_1(t_2 + t_3)C_{X2}]} \quad (10)$$

Equation (10) and equations (5) through (9) are used to determine the configuration of two optical power aspheric mirrors 18 and 20 which will produce a wobble corrected scan line, while ensuring that the second reflection will be superimposed on the first reflection, at the center of scan. Since the condition of infinite conjugates is no longer applicable, the position of the object point ahead of the first facet reflection must be known. This value, $t_5$, is given by the equation:

$$t_5 = \frac{t_0 t_3 \cos i_{02}}{2C_{x2}t_1(t_2 + t_3) - (t_1 + t_2)\cos i_{02}} \quad (11)$$

By iteration between the equations given and software for optical analysis, an exemplary finite conjugate diffraction limited scanner design is obtainable for 300 spots per inch. In an exemplary system, the pyramid polygon has 16 facets, with an active scan length of 10.06 inches. The duty cycle of this scan length is 79%. The scan is not linear, the spot velocity is that of a beam rotating at a constant angular rate, writing on a flat surface 8.200389 inches from the pivot point of the beam, through angles from zero (center of scan) to 31.5312 degrees (end of scan). The equation of this simulation is h'=8.200389 tanα where α is the polygon rotation angle and h' is the scanning spot distance from the center of scan position. The accuracy of this simulation is better than 25 millionths of an inch.

At the center of scan position of the exemplary finite conjugate scanner, all aberrations are corrected, and the spot is a perfect diffraction limited spot. At the start (or end) of scan there is a small amount of coma and field curvature in the scan plane, but the ray error is no more than about one-twentieth of a wave length of infrared light (800 n.m.). In the cross-scan plane ray errors are very small, better than one-fiftieth of a wavelength. For blue light (435.8 n.m.) the geometric aberrations do not change since the system consists only of mirrors, but these aberrations as a fraction of wavelength do change. But the overriding effect of changing wavelength is that for blue light the f/number, f/number being the ratio of the focal length to the clear aperture of a lens is much larger, to obtain 300 spots per inch. Reducing the aperture to increase the f/number eliminates the rays which cause most of the aberrations. As a result, ray errors to blue light are less than one-fortieth of a wavelength at 300 spots per inch. If the aperture is not reduced, the system will operate at 600 spots per inch to blue light. At this high resolution, the ray errors are less than one-tenth wavelength, at the end of scan. Ray errors are less than one-sixteenth of the blue wavelength over most of the scan.

Figure 3:
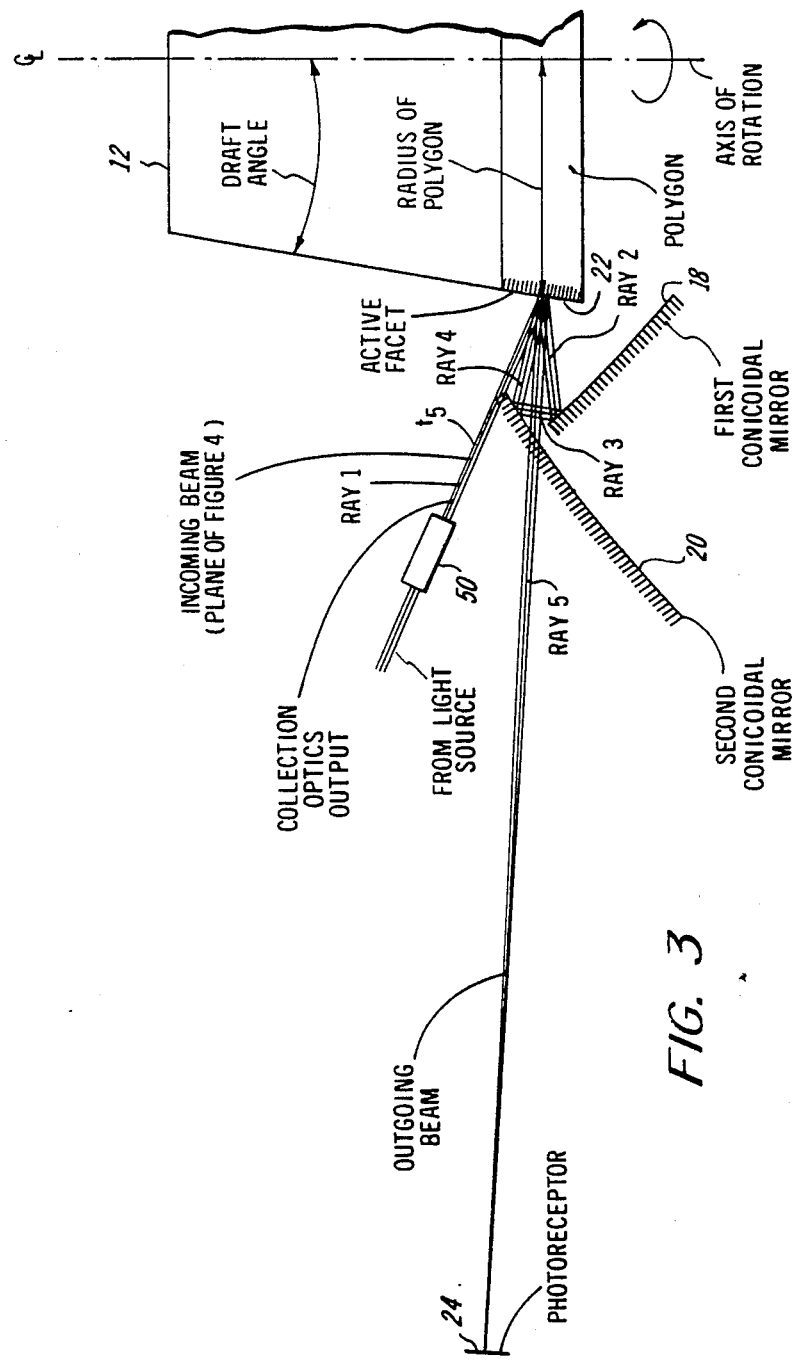

A cross-scan view of the exemplary finite conjugate diffraction-limited scanner having two conicoidal mirrors and a draft angle polygon, is shown in FIG. 3. A collimated beam, such as from laser 10 of FIG. 1, can be used, with that beam being decollimated by conventional collection optics 50, as shown in FIG. 3 to provide ray 1. The collection optics is some optical means of gathering the output beam from some source, such as a diode laser, a helium-neon laser, a modulator, or an incandescent lamp, and changing it to the proper size and divergence angle for the scanning system. For example, the collection optics could be a specifically designed microscope objective, or a glass lens of the correct focal length with a plastic aspheric surface, such as made by Phillips of Eindhaven, The Netherlands. For this invention, the collection optics causes the ray 1 of FIG. 3 to appear to emanate from a point source located at a distance of 7.767 inches ahead of the polygon facet 22, that is, $t_5 = 7.767$ inches, when measured from the virtual point source.

Figure 4:
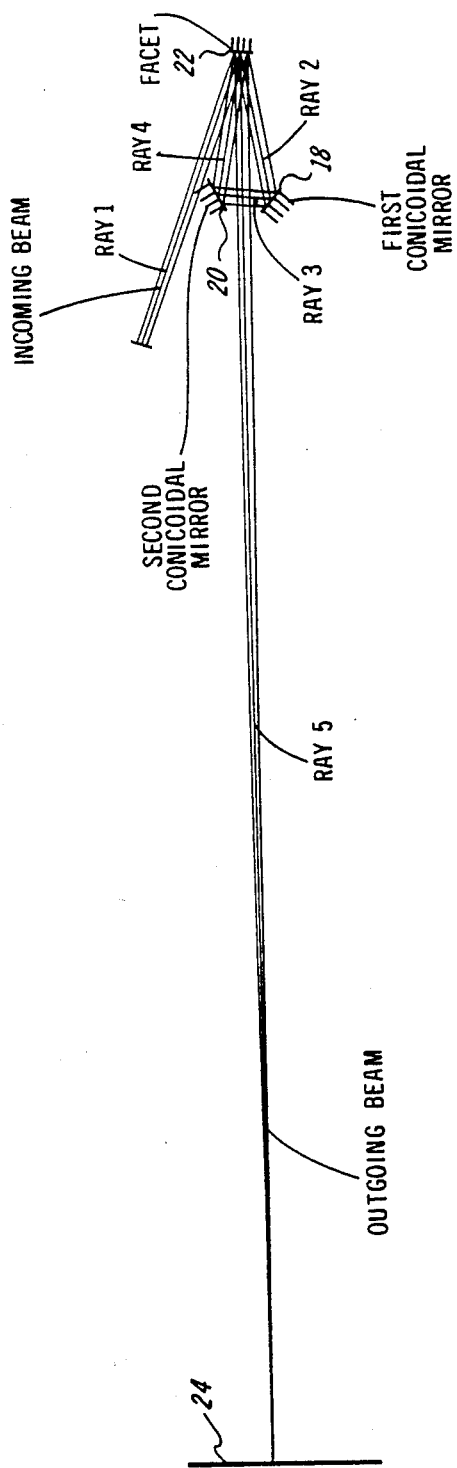
FIG. 4 is a cross-scan plane view of the system of FIG. 3 with partial mirror sections shown.

Continuing further with the exemplary system of FIG. 3, the polygon 12 has a draft angle of 8.3 degrees, and the beam is incident on the facet at an angle of 15 degrees to the facet normal. The beam is reflected to the first mirror 18. This mirror is shown symmetrical about its own axis, but only a small portion is used during the scan, as shown in FIG. 4. Returning to FIG. 3, the beam is reflected from the first mirror 18 to the second mirror 20. This mirror is also shown symmetrical about its own axis, but again only a small portion is used. From the second mirror 20, the beam is reflected back to the facet 22. At the center of scan the beam strikes the facet the second time at the same place it was reflected the first time. After reflection from the facet the second time, the beam, desirable would pass between the two coincoidal mirrors, and is focused at the photoreceptor 24.

Figure 5:
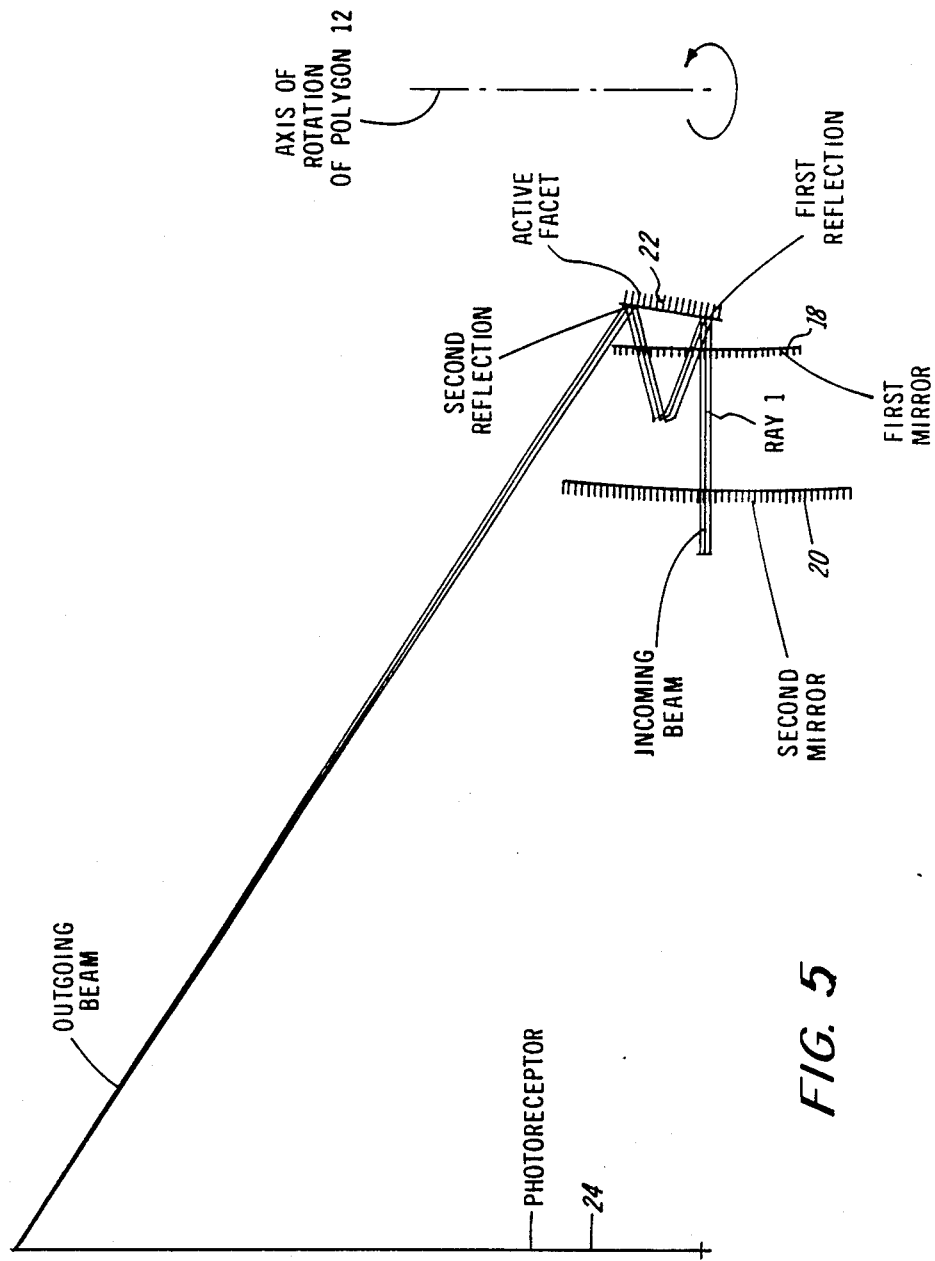
FIG. 5 is a scan plane view of the system of FIG. 3.

A scan plane view of the exemplary system, at the end of scan position, is shown in FIG. 5. The reference plane for this view is the plane of the incoming beam, this plane is normal to the paper in FIG. 4. All components seen in FIG. 5 are seen as projected onto this plane. For example, the polygon radius is 1.5 inches in FIG. 4, in FIG. 5 it is the projection of 1.5 inches onto the reference plane. Since the plane of the polygon rotation is at an angle of 15+8.3 degrees to the reference plane, the radius of the polygon as seen in FIG. 5 is 1.5×cos (23.3) or 1.378 inches.

In FIG. 5, the mirrors are shown as a section through their own axes, projected onto the reference plane. The actual points of reflection are not on these sections through their axes. The bends in the beam, which indicate reflection from the mirrors, occur at the actual points of reflection projected onto the reference plane.

The system has been adjusted so that the second reflection remains on the facet as long as the edge of the facet has not begun to move through the beam at the first reflection. This adjustment has the effect that each reflection is the same distance from the center of scan position. As the edge of the facet begins to pass through the beam at the first reflection, the beam begins to walk off the other edge of the facet at the second reflection. This adjustement is made by reducing the polygon radius.

A specific prescription for the design of the system of FIGS. 3-5 is set forth in Table II, once again in Code V.

In both Tables I and II, surfaces 6 and 22 correspond to facet 22 at the first and second reflections, respectively, and surfaces 13, 15, and 29 correspond respectively to mirror 18, mirror 20 and surface 24. Positions 1 through 5 of the Zoom Data of Tables I and II represent various angular positions of facet 22, and position 6 of the Zoom Data of Tables I and II gives the changes that occur in the respective systems at position 5 with 3 arc-minutes of wobble.

TABLE I

SURFACE DATA

| SURFACE # | CURVATURE | THICKNESS | | GLASS | | | STOP | TYPE |
|---|---|---|---|---|---|---|---|---|
| OBJECT SURFACE | 0.00000000 | | ∞ | | | | | |
| 1 | 0.00000000 | | 1.500000 | | | | S | |
| 2 | DECE | 0.000000 | 0.000000 | 30.000000 | 0.000000 | 0.000000 | | |
| | 0.00000000 | | 0.000000 | | | | | |
| 3 | DECE | 0.000000 | 0.000000 | 16.530000 | 0.000000 | 0.000000 | | |
| | 0.00000000 | | 0.950000 | | | | | |
| 4 | DECE | 0.000000 | 0.000000 | 0.000000 | 0.000000 | 0.000000 | | |
| | 0.00000000 | | −0.950000 | | | | | |
| 5 | DECE | 0.000000 | 0.000000 | −16.530000 | 0.000000 | 0.000000 | | |
| | 0.00000000 | | 0.000000 | | | | | |
| 6 | DECE | 0.000000 | 0.000000 | 0.000000 | 0.000000 | 0.000000 | | |
| | 0.00000000 | | 0.000000 | | REFL | | | |
| 7 | DECE | 0.000000 | 0.000000 | 0.000000 | 0.000000 | 0.000000 | | |
| | 0.00000000 | | 0.000000 | | | | | |
| 8 | DECE | 0.000000 | 0.000000 | 16.530000 | 0.000000 | 0.000000 | | |
| | 0.00000000 | | 0.950000 | | | | | |
| 9 | DECE | 0.000000 | 0.000000 | 0.000000 | 0.000000 | 0.000000 | | |
| | 0.00000000 | | −0.950000 | | | | | |
| 10 | DECE | 0.000000 | 0.000000 | −16.530000 | 0.000000 | 0.000000 | | |
| | 0.00000000 | | 0.000000 | | | | | |
| 11 | DECE | 0.000000 | 0.000000 | 30.000000 | 0.000000 | 0.000000 | | |
| | 0.00000000 | | 0.000000 | | | | | |
| 12 | DECE | 0.000000 | 0.000000 | 14.865884 | 0.000000 | 0.000000 | | |
| | 0.00000000 | | −1.720609 | | | | | |
| 13 | −0.04544414 | | −1.487923 | | | | | |
| | −190.13930750 | | | | | | | |
| 14 | DECE | 0.000000 | 0.000000 | 94.149846 | 0.000000 | 0.000000 | | |
| | 0.00000000 | | 1.299353 | | | | | |
| 15 | −0.24686997 | | 0.000000 | | REFL | | | |
| | −4.48374785 | | | | | | | |
| 16 | RETU | 2 | | | | | | |
| | 0.00000000 | | 0.000000 | | | | | |
| 17 | DECE | 0.000000 | 0.000000 | 90.000000 | 0.000000 | 0.000000 | | |
| | 0.00000000 | | 0.000000 | | | | | |
| 18 | DECE | 0.000000 | 0.000000 | 90.000000 | 0.000000 | 0.000000 | | |
| | 0.000000 | | 0.000000 | | | | | |
| 19 | DECE | 0.000000 | 0.000000 | 16.530000 | 0.000000 | 0.000000 | | |
| | 0.00000000 | | −0.950000 | | | | | |
| 20 | DECE | 0.000000 | 0.000000 | 0.000000 | 0.000000 | 0.000000 | | |
| | 0.00000000 | | 0.950000 | | | | | |
| 21 | DECE | 0.000000 | 0.000000 | −16.530000 | 0.000000 | 0.000000 | | |
| | 0.00000000 | | 0.000000 | | | | | |
| 22 | DECE | 0.000000 | 0.000000 | 0.000000 | 0.000000 | 0.000000 | | |
| | 0.00000000 | | 0.000000 | | REFL | | | |
| 23 | DECE | 0.000000 | 0.000000 | 0.000000 | 0.000000 | 0.000000 | | |
| | 0.00000000 | | 0.000000 | | | | | |
| 24 | DECE | 0.000000 | 0.000000 | 16.530000 | 0.000000 | 0.000000 | | |
| | 0.00000000 | | −0.950000 | | | | | |
| 25 | DECE | 0.000000 | 0.000000 | 0.000000 | 0.000000 | 0.000000 | | |
| | 0.00000000 | | 0.950000 | | | | | |
| 26 | DECE | 0.000000 | 0.000000 | −16.530000 | 0.000000 | 0.000000 | | |
| | 0.00000000 | | 0.000000 | | | | | |
| 27 | DECE | 0.000000 | 0.000000 | 9.160000 | 0.000000 | 0.000000 | | |
| | 0.00000000 | | 1.500000 | | | | | |
| 28 | 0.00000000 | | 8.500000 | | | | | |
| 29 | 0.00000000 | | 0.000000 | | P/R | | | |

SPECIFICATION DATA

| | | |
|---|---|---|
| EPD | | 0.07092 |
| DIM | | I |
| WL | | 800 |

ZOOM DATA

| | POS 1 | POS 2 | POS 3 | POS 4 | POS 5 | POS 6 |
|---|---|---|---|---|---|---|
| BDE4 | 0.000000 | 1.812500 | 3.625000 | 5.437500 | 7.250000 | 7.250000 |
| BDE9 | 0.000000 | −1.812500 | −3.625000 | −5.437500 | −7.250000 | −7.250000 |
| BDE20 | 0.000000 | −1.812500 | −3.625000 | −5.437500 | −7.250000 | −7.250000 |
| BDE25 | 0.000000 | 1.812500 | 3.625000 | 5.437500 | 7.250000 | 7.250000 |
| ADE6 | 0.000000 | 0.000000 | 0.000000 | 0.000000 | 0.000000 | 0.050000 |
| ADE7 | 0.000000 | 0.000000 | 0.000000 | 0.000000 | 0.000000 | −0.050000 |
| ADE22 | 0.000000 | 0.000000 | 0.000000 | 0.000000 | 0.000000 | 0.050000 |
| ADE23 | 0.000000 | 0.000000 | 0.000000 | 0.000000 | 0.000000 | −0.050000 |

TABLE II

SURFACE DATA

| SURFACE # | CURVATURE | THICKNESS | GLASS | STOP | TYPE |
|---|---|---|---|---|---|
| OBJECT SURFACE | 0.00000000 | 6.267464 | | | |

TABLE II-continued

| | | | | | | | |
|---|---|---|---|---|---|---|---|
| 1 | 0.00000000 | | 1.500000 | | | | S |
| 2 | DECE | 0.000000 | 0.000000 | 15.000000 | 0.000000 | 0.000000 | |
| | 0.00000000 | | 0.000000 | | | | |
| 3 | DECE | 0.000000 | 0.000000 | 8.300000 | 0.000000 | | |
| | 0.00000000 | | 1.500000 | | | | |
| 4 | DECE | 0.000000 | 0.000000 | 0.000000 | 0.000000 | 0.000000 | |
| | 0.00000000 | | −1.500000 | | | | |
| 5 | DECE | 0.000000 | 0.000000 | −8.300000 | 0.000000 | 0.000000 | |
| | 0.00000000 | | 0.000000 | | | | |
| 6 | DECE | 0.000000 | 0.000000 | 0.000000 | 0.000000 | 0.000000 | |
| | 0.00000000 | | 0.000000 | REFL | | | |
| 7 | DECE | 0.000000 | 0.000000 | 0.000000 | 0.000000 | 0.000000 | |
| | 0.00000000 | | 0.000000 | | | | |
| 8 | DECE | 0.000000 | 0.000000 | 8.300000 | 0.000000 | 0.000000 | |
| | 0.00000000 | | 1.50000 | | | | |
| 9 | DECE | 0.000000 | 0.000000 | 0.000000 | 0.000000 | 0.000000 | |
| | 0.00000000 | | −1.500000 | | | | |
| 10 | DECE | 0.000000 | 0.000000 | −8.300000 | 0.000000 | 0.000000 | |
| | 0.00000000 | | 0.000000 | | | | |
| 11 | DECE | 0.000000 | 0.000000 | 15.000000 | 0.000000 | 0.000000 | |
| | 0.00000000 | | 0.000000 | | | | |
| 12 | DECE | 0.000000 | 0.000000 | 38.902000 | 0.000000 | 0.000000 | |
| | 0.00000000 | | −0.583213 | | | | |
| 13 | 0.09285782 | | −0.654055 | REFL | | | CONICOID |
| | −305.03317261 | | | | | | |
| 14 | DECE | 0.000000 | 0.000000 | 81.815600 | 0.000000 | 0.000000 | |
| | 0.00000000 | | 0.752692 | | | | |
| 15 | −0.11353053 | | 0.000000 | REFL | | | CONICOID |
| | −114.53850555 | | | | | | |
| 16 | RETU | 2 | | | | | |
| | 0.00000000 | | 0.000000 | | | | |
| 17 | DECE | 0.000000 | 0.000000 | 90.000000 | 0.000000 | 0.000000 | |
| | 0.00000000 | | 0.000000 | | | | |
| 18 | DECE | 0.000000 | 0.000000 | 90.000000 | 0.000000 | 0.000000 | |
| | 0.00000000 | | 0.000000 | | | | |
| 19 | DECE | 0.000000 | 0.000000 | 8.300000 | 0.000000 | 0.000000 | |
| | 0.00000000 | | −1.500000 | | | | |
| 20 | DECE | 0.000000 | 0.000000 | 0.000000 | 0.000000 | 0.000000 | |
| | 0.00000000 | | 1.500000 | | | | |
| 21 | DECE | 0.000000 | 0.000000 | −8.300000 | 0.000000 | 0.000000 | |
| | 0.00000000 | | 0.000000 | | | | |
| 22 | DECE | 0.000000 | 0.000000 | 0.000000 | 0.000000 | 0.000000 | |
| | 0.00000000 | | 0.000000 | REFL | | | |
| 23 | DECE | 0.000000 | 0.000000 | 0.000000 | 0.000000 | 0.000000 | |
| | 0.00000000 | | 0.000000 | | | | |
| 24 | DECE | 0.000000 | 0.000000 | 8.300000 | 0.000000 | 0.000000 | |
| | 0.00000000 | | −1.500000 | | | | |
| 25 | DECE | 0.000000 | 0.000000 | 0.000000 | 0.000000 | 0.000000 | |
| | 0.00000000 | | 1.500000 | | | | |
| 26 | DECE | 0.000000 | 0.000000 | −8.300000 | 0.000000 | 0.000000 | |
| | 0.00000000 | | 0.000000 | | | | |
| 27 | DECE | 0.000000 | 0.000000 | 4.759000 | 0.000000 | 0.000000 | |
| | 0.0000000 | | 1.500000 | | | | |
| 28 | 0.00000000 | | 6.000000 | | | | |
| 29 | 0.00000000 | | 0.000000 | P/R | | | |

| SPECIFICATION DATA | |
|---|---|
| EPD | 0.04603 |
| DIM | I |
| WL | 800.00 |

| ZOOM DATA | | | | | | |
|---|---|---|---|---|---|---|
| | POS 1 | POS 2 | POS 3 | POS 4 | POS 5 | POS 6 |
| BDE4 | 0.000000 | 2.219200 | 4.438400 | 6.657600 | 8.876800 | 8.876800 |
| BDE9 | 0.000000 | −2.219200 | −4.438400 | −6.657600 | −8.876800 | −8.876800 |
| BDE20 | 0.000000 | −2.219200 | −4.438400 | −6.657600 | −8.876800 | −8.876800 |
| BDE25 | 0.000000 | 2.219200 | 4.438400 | 6.657600 | 8.876800 | 8.876800 |
| ADE6 | 0.000000 | 0.000000 | 0.000000 | 0.000000 | 0.000000 | 0.050000 |
| ADE7 | 0.000000 | 0.000000 | 0.000000 | 0.000000 | 0.000000 | −0.050000 |
| ADE22 | 0.000000 | 0.000000 | 0.000000 | 0.000000 | 0.000000 | 0.050000 |
| ADE23 | 0.000000 | 0.000000 | 0.000000 | 0.000000 | 0.000000 | −0.050000 |

What is claimed is:

1. A scanning system including a rotatable mirror assembly with multiple reflective surfaces, said surfaces having a predetermined draft angle with the axis of rotation of said assembly, first means for introducing a beam of light toward said multi-surfaced mirror assembly, said light being reflected in turn by each active surface of said mirror assembly, a first mirror having an aspheric surface placed in the path of light reflected from the active surface of said multi-surfaced mirror assembly, said first mirror having a geometric focus at the active surface of said mirror assembly, a second mirror having an aspheric surface placed in the path of the reflected light from said first mirror, said second mirror reflecting said light back to the active surface of said multi-surfaced mirror assembly for reflection toward a surface to be scanned, the scanning light beam having no wobble effects and reduced bow effects, and being focussed at said surface to be scanned, wherein the curvatures of said first and second aspheric surface mirrors are determined according to the following relationships, respectively:

$$C_1 = -\frac{t_2 \cos i_1}{2 t_1 t_3},$$

$$C_2 = \frac{(t_1 + t_2) \cos i_2}{2 t_1 (t_2 + t_3)}.$$

where $t_1$ is the distance between said first and second aspheric surface mirrors, $t_2$ is the distance between said second aspheric surface mirror and said active facet of said mirror assembly, $t_3$ is the distance from said active facet to said surface to be scanned, and angles $i_1$ and $i_2$ being the angles of incidence of said light beam at said first and second aspheric surface mirrors, respectively.

2. A scanning system including a rotatable mirror assembly with multiple reflective surfaces, said surfaces having a predetermined draft angle with the axis of rotation of said assembly, first means for introducing a beam of light toward said multi-surfaced mirror assembly, said light being reflected in turn by each active surface of said mirror assembly, a first mirror having an aspheric surface placed in the path of light reflected from the active surface of said multi-surfaced mirror assembly, said first mirror having a geometric focus at the active surface of said mirror assembly, a second mirror having an aspheric surface placed in the path of the reflected light from said first mirror, said second mirror reflecting said light back to the active surface of said multi-surfaced mirror assembly for reflection toward a surface to be scanned, the scanning light beam having no wobble effects and reduced bow effects, and being focussed at said surface to be scanned, wherein the curvatures of said first and second aspheric surface mirrors are determined according to the following relationships, respectively:

$$C_1 = \frac{\cos i_1 [(t_0 + t_1 + t_2) \cos i_2 - 2(t_0 + t_1)(t_2 + t_3) C_2]}{2 t_0 [(t_1 + t_2 + t_3) \cos i_2 - 2 t_1 (t_2 + t_3) C_2]}$$

where $C_1$ is the curvature of said first aspheric surface mirror, $C_2$ is the curvature of said second aspheric surface mirror, $t_0$ is the distance between the active facet of said mirror assembly, $t_1$ is the distance between said first and second aspheric surface mirrors, $t_2$ is the distance between said second aspheric surface mirror and said active facet of said mirror assembly, $t_3$ is the distance from said active facet to said surface to be scanned, and angles $i_1$ and $i_2$ being the angles of incidence of said light beam at said first and second aspheric surface mirrors, respectively.

* * * * *